(12) United States Patent
Kawano et al.

(10) Patent No.: US 10,008,923 B2
(45) Date of Patent: Jun. 26, 2018

(54) SOFT START CIRCUIT AND POWER SUPPLY DEVICE EQUIPPED THEREWITH

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: ABLIC INC., Chiba (JP)

( * ) Notice: Subject to any disclaimer, the term of this patent is extended or adjusted under 35 U.S.C. 154(b) by 0 days. days.

(21) Appl. No.: 15/380,352

(22) Filed: Dec. 15, 2016

(65) Prior Publication Data

US 2017/0179812 A1   Jun. 22, 2017

(30) Foreign Application Priority Data

Dec. 17, 2015   (JP) ................. 2015-246670

(51) Int. Cl.
*H02M 1/36* (2007.01)
*H02M 3/156* (2006.01)

(52) U.S. Cl.
CPC ............. *H02M 1/36* (2013.01); *H02M 3/156* (2013.01)

(58) Field of Classification Search
CPC ................................ H02M 1/36; H02M 3/156

USPC ............................................. 323/238; 363/49
See application file for complete search history.

(56) References Cited

U.S. PATENT DOCUMENTS 6,377,106 B1 *   4/2002   Rozsypal ................ G05F 3/205
326/68

FOREIGN PATENT DOCUMENTS

| JP | 2007-159306 A | | 6/2007 |
| JP | 2007159306 A | * | 6/2007 |
| JP | 2015-65735 A | * | 4/2015 |

* cited by examiner

*Primary Examiner* — Jue Zhang
*Assistant Examiner* — Jye-June Lee
(74) *Attorney, Agent, or Firm* — Brinks Gilson & Lione

(57) ABSTRACT

To provide a soft start circuit capable of obtaining a high-accuracy soft start time. The soft start circuit is equipped with a constant current source, an output terminal which outputs a soft start voltage, a ground terminal, a first transistor which is connected between the constant current source and the ground terminal and has a gate and a drain both short-circuited, a second transistor which is connected between the constant current source and the output terminal and receives a clock signal at a gate thereof, and a capacitor connected between the second transistor and the ground terminal.

4 Claims, 2 Drawing Sheets

SOFT START CIRCUIT AND POWER SUPPLY DEVICE EQUIPPED THEREWITH

RELATED APPLICATIONS

This application claims priority under 35 U.S.C. § 119 to Japanese Patent Application No. 2015-246670 filed on Dec. 17, 2015, the entire content of which is hereby incorporated by reference.

BACKGROUND OF THE INVENTION

Field of the Invention

The present invention relates to a soft start circuit and a power supply device equipped therewith.

Background Art

A power supply device such as a DCDC converter has generally been provided with a soft start circuit for preventing an inrush current at power-on.

The related art soft start circuit is accompanied by a problem that it needs a capacitor high in capacitance value to obtain a soft start voltage which rises in a few millisecond's time, and occupies a large area within an IC chip.

To cope with such a problem, there has been proposed in Patent Document 1, a method of adapting such a configuration that a switch is turned ON/OFF using a clock signal and a capacitor is intermittently charged with a constant current, thereby reducing the capacitor and suppressing a circuit scale.

[Patent Document 1] Japanese Patent No. 4853003

SUMMARY OF THE INVENTION

However, in the method of intermittently charging the capacitor using the clock signal, a current different from a desired current value flows into the capacitor immediately after the switching of the switch because an operating point of a transistor which configures the switch differs when the switch is turned ON and OFF. A problem therefore arises in that a soft start time is deviated from a value theoretically calculated from a capacitance and a current value, and difficulty occurs in obtaining a desired soft start time.

The present invention has been made in view of the above problems and aims to provide a soft start circuit capable of obtaining a high-accuracy soft start time.

In order to solve the above problems, there is provided a soft start circuit of the present invention, which is equipped with a constant current source, an output terminal which outputs a soft start voltage, a ground terminal, a first transistor which is connected between the constant current source and the ground terminal and has a gate and a drain both short-circuited, a second transistor which is connected between the constant current source and the output terminal and receives a clock signal at a gate thereof, and a capacitor connected between the second transistor and the ground terminal.

In the soft start circuit of the present invention, when the second transistor is in an ON state, a part of a current flowing from the constant current source is supplied to the capacitor through the second transistor, so that the capacitor is charged. When the second transistor is in an OFF state, all the current flowing from the constant current source flows into the ground terminal through the first transistor. That is, the current continues to flow through the soft start circuit even when the second transistor is both ON and OFF.

Thus, as compared with the method of turning OFF the transistor as the switch to stop the current as in Patent Document 1, an operating point is determined from immediately after the second transistor is turned ON, and a desired current can be made to flow. Therefore, a soft start voltage Vref_ss rises stably. Thus, according to the present invention, a high-accuracy soft start time can be obtained.

DETAILED DESCRIPTION OF THE PREFERRED EMBODIMENTS

A preferred embodiment of the present invention will hereinafter be described with reference to the accompanying drawings.

Figure 1:
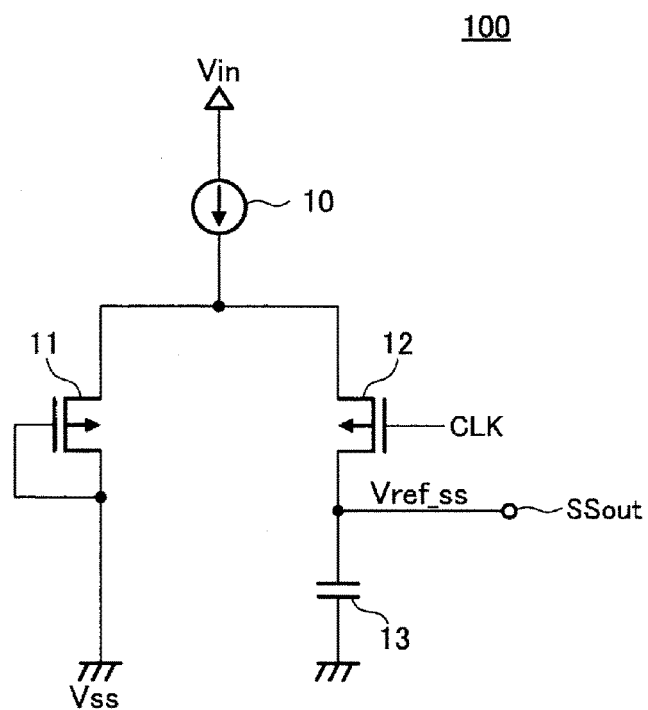
FIG. 1 is a circuit diagram of a soft start circuit according to an embodiment of the present invention.

FIG. 1 is a circuit diagram of a soft start circuit 100 according to the present embodiment.

The soft start circuit 100 according to the present embodiment is equipped with a constant current source 10, PMOS transistors 11 and 12, and a capacitor 13.

DESCRIPTION OF REFERENCE SIGNS

The constant current source 10 has one end connected to a power supply input terminal Vin.

The PMOS transistor 11 is connected between the constant current source 10 and a ground terminal Vss and has a gate and a drain both short-circuited.

The PMOS transistor 12 is connected between the constant current source 10 and an output terminal SSout and has a gate which receives a clock signal CLK.

The capacitor 13 is connected between the PMOS transistor 12 and the ground terminal Vss.

The power supply input terminal Vin is supplied with an input voltage. The ground terminal Vss is supplied with a ground voltage. A soft start voltage Vref_ss is outputted from the output terminal SSout.

The soft start circuit 100 configured as described above is operated as follows:

When the clock signal CLK is brought into a low level after power-on, the transistor 12 is turned ON and the transistor 11 is always ON. Thus, a current corresponding to the size ratio of the transistors 11 and 12 flows through the transistors 11 and 12 respectively.

Then, a part of the current from the constant current source 10 flows into the capacitor 13 through the transistor 12, so that the capacitor 13 is charged.

On the other hand, when the clock signal CLK is brought into a high level, the transistor 12 is turned OFF so that all the current from the constant current source 10 flows into the ground terminal Vss through the transistor 11 being always ON.

Thus, according to the present embodiment, since the current always flows through the soft start circuit 100 even when the transistor 12 is both ON and OFF, the voltage at a connecting point of the constant current source 10 and the transistors 11 and 12 can be kept substantially constant. That is, when the transistor 12 is ON and OFF, a source voltage of the transistor 12 remains almost unchanged, and its operation point does not substantially change until the transistor 12 is stabilized from immediately after being turned ON. Accordingly, the soft start voltage Vref_ss is raised stably and a high-accuracy soft start time can be obtained.

Here, the size of the transistor 11 is made sufficiently larger than that of the transistor 12, for example, the size ratio of the transistors 11 and 12 is made as large as about 9:1.

This is because the current flowing through the capacitor is determined by the size ratio of the two transistors 11 and 12. That is, the current flowing through the capacitor 13 can be made small by increasing the size ratio, whereby the soft start time can be lengthened by the small capacitor.

Figure 2:
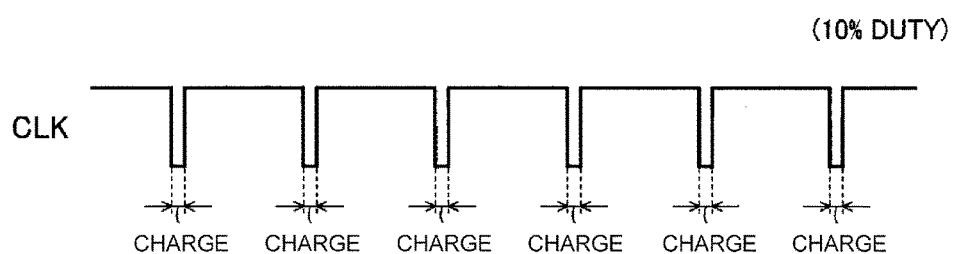
FIG. 2 is a waveform diagram illustrating one example of a clock signal in FIG. 1.

Further, as for the DUTY of the clock signal CLK inputted to the transistor 12, the smaller, the better. As illustrated in FIG. 2, for example, the DUTY is assumed to be about 10%.

Thus, since the ON time of the transistor 12 becomes short, and the time when the current flows through the transistor 12 can be made short, an effect is brought about that the time required for charging to the capacitor 13 also becomes short, and the soft start time can further be lengthened by the small capacitor. Further, this effect becomes large as a current amount made to flow into the ground terminal Vss through the transistor 11 and the time required to make it to flow are increased.

Further, the reduction in the DUTY of the clock signal CLK contributes to improving the accuracy of the constant current source, i.e., the accuracy of the soft start time. This reason will be described below.

In the related art soft start circuit, a small current of about 100 nA is generated by a constant current source, and the capacitor is charged by the small current to thereby lengthen the soft start time.

On the other hand, in the present embodiment, if the DUTY of the clock signal CLK is set to 10%, the period during which the current flows through the transistor 12 becomes 1/10 even when the current of the constant current source 10 is made to be large as 1 μA. It is therefore possible to obtain a soft start time equivalent to setting the current of the constant current source to 100 nA in the related art soft start circuit.

When the current of the constant current source is made small, for example, when an attempt is made to generate a small current by returning the current by a current mirror, an error becomes larger. Further, when the current becomes small, it is apt to receive the influence of a leakage current and the influence of noise as well. Therefore, since the constant current source for the large current rather than that for the small current can be manufactured with high accuracy, the constant current source of 1 μA rather than the constant current source of 100 nA is high in accuracy.

According to the present embodiment, the constant current source 10 high in accuracy can be utilized, so that the accuracy of the soft start time can be made higher.

A description will next be made about an example in which the soft start circuit of the present invention is used in a power supply device.

Figure 3:
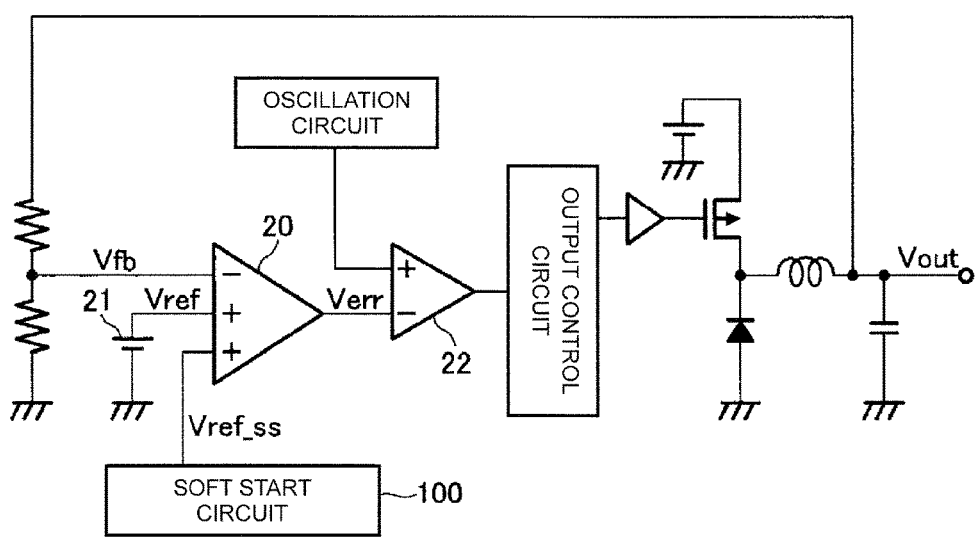
FIG. 3 is a circuit diagram of a switching regulator equipped with the soft start circuit of FIG. 1.

FIG. 3 is a circuit diagram of a DCDC converter 200 equipped with the soft start circuit 100 of FIG. 1.

Since the DCDC converter 200 is general in configuration, its detailed description will be omitted herein. A description will be made about how a soft start voltage Vref_ss which is an output of the soft start circuit 100 is used.

A reference voltage Vref of a reference voltage circuit 21 and the soft start voltage Vref_ss are respectively inputted to two non-inversion input terminals of an error amplifier circuit 20. A feedback voltage Vfb obtained by dividing an output voltage Vout of the DCDC converter 200 is inputted to an inversion input terminal of the error amplifier circuit 20.

The error amplifier circuit 20 compares the lower one of the reference voltage Vref and the soft start voltage Vref_ss, and the feedback voltage Vfb and outputs an error voltage Verr to a PWM comparator 22.

The soft start voltage Vref_ss gradually rises after power-on, but while the soft start voltage Vref_ss is lower than the reference voltage Vref, the feedback voltage Vfb and the soft start voltage Vref_ss are compared in the error amplifier circuit 20, and the reference voltage Vref does not influence the error voltage Verr as the output thereof.

Then, when a predetermined soft start time has elapsed, the soft start voltage Vref_ss becomes higher than the reference voltage Vref. Thus, afterwards, in the error amplifier circuit 20, the feedback voltage Vfb and the reference voltage Vref are compared with each other, and the soft start voltage Vref_ss will not affect the error voltage Verr as the output.

Thus, the soft start circuit 100 is capable of achieving a soft start function in the DCDC converter 200.

According to the soft start circuit 100 of the present embodiment as described above, a high-accuracy soft start time can be obtained, and a high-accuracy soft start is made possible by using the soft start circuit 100 in the DCDC converter 200.

Although the embodiment of the present invention has been described above, the present invention is not limited to the embodiment referred to above. It is needless to say that various changes can be made thereto within the scope not departing from the gist of the present invention.

For example, although the above embodiment has illustrated the example in which the PMOS transistors are used as the transistors 11 and 12, an NMOS transistor may be used for both of the transistors 11 and 12 or either one thereof.

Further, although the above embodiment has illustrated the example in which the soft start circuit of the present invention is used in the DCDC converter, it is not limited to this. The soft start circuit can appropriately be used in a power supply device which requires a soft start.

What is claimed is:

1. A soft start circuit comprising:
   a constant current source;
   a first transistor and a second transistor connected in parallel between the constant current source and a ground, wherein
   the first transistor has a source-1 connected to the constant current source, and a gate-1 and a drain-1 both short-circuited to the ground so that the first transistor stays on to keep a continuous current flowing from the constant current source to the ground through the first transistor, and the second transistor has a source-2 connected to the constant current source, a gate-2 receiving a single clock signal that turns the second transistor on and off, and a drain-2 connected to an output terminal that outputs a soft start voltage; and
   a capacitor connected between the drain-2 of the second transistor and the ground and charged by a charging current from the constant current source when the second transistor is turned on by the single clock signal, wherein the single clock signal functions as a sole switching signal to control charging of the capacitor in such a way that charging of the capacitor starts as the single clock signal turns on the second transistor, and charging of the capacitor ends as the single clock signal turns off the second transistor, and the continuous current flowing through the first transistor changes in such a manner that the continuous current is equal to an entire current flowable from the current source when the second transistor is turned off by the single clock signal, and the continuous current is equal to the entire current flowable from the current source minus the charging current when the second transistor is turned on by the single clock signal.

2. The soft start circuit according to claim 1, wherein a size of the first transistor is larger than that of the second transistor.

3. A power supply device comprising:
   the soft start circuit according to claim 2,
   wherein a soft start is executed at turn-on of power using a soft start voltage outputted by the soft start circuit.

4. A power supply device comprising:
   the soft start circuit according to claim 1,
   wherein a soft start is executed at turn-on of power using a soft start voltage outputted by the soft start circuit.

* * * * *